United States Patent
Kacel et al.

(10) Patent No.: US 10,112,778 B2
(45) Date of Patent: Oct. 30, 2018

(54) CONVEYOR DRIVE AND SYSTEM FOR UNIT HANDLING CONVEYORS

(71) Applicant: Nor-Tech Industrial Corp., Alpena, MI (US)

(72) Inventors: Richard J. Kacel, Lincoln, MI (US); David V. Hall, Cookeville, TN (US)

(73) Assignee: Nor-Tech Industrial Corp., Alpena, MI (US)

( * ) Notice: Subject to any disclaimer, the term of this patent is extended or adjusted under 35 U.S.C. 154(b) by 0 days.

(21) Appl. No.: 15/437,129

(22) Filed: Feb. 20, 2017

(65) Prior Publication Data

US 2018/0237226 A1    Aug. 23, 2018

(51) Int. Cl.
*B65G 23/22* (2006.01)
*B65G 23/00* (2006.01)
*B65G 13/07* (2006.01)

(52) U.S. Cl.
CPC ............ *B65G 23/22* (2013.01); *B65G 13/07* (2013.01)

(58) Field of Classification Search
None
See application file for complete search history.

(56) References Cited

U.S. PATENT DOCUMENTS

| 5,285,887 | A   | * | 2/1994 | Hall | B65G 43/10 198/460.1 |
| 6,035,999 | A   |   | 3/2000 | Hall | |
| 6,244,421 | B1  |   | 6/2001 | Hall | |
| 6,253,906 | B1  |   | 7/2001 | Hall | |
| 7,537,107 | B2  | * | 5/2009 | Hall | B65G 13/07 198/781.03 |
| 9,004,263 | B2  |   | 4/2015 | Hall | |
| 2014/0129026 | A1 |  | 5/2014 | Hall | |
| 2015/0012140 | A1 | * | 1/2015 | Fang | G05B 19/0421 700/275 |

* cited by examiner

*Primary Examiner* — Kavel Singh
(74) *Attorney, Agent, or Firm* — Warner Norcross + Judd LLP (57) ABSTRACT

A standardized drive system for a roller conveyor assembly having a motor with an integrated motor drive unit with superior heat transfer characteristics. A motor driver annex is attached to the motor housing and provides a mounting method and a heat sink for cooling the DMOS that provides power to the motor phases. The system includes an easily accessible multi-mode conveyor control management system which provides design flexibility with minimal cost and additionally adds functional improvements for transportation modes. The motor is configured to be mounted on a metal bracket below the rollers and between the side frames of the conveyor assembly. The control system is exceptionally flexible, allowing the system to be configured to operate in many common conveying modes.

13 Claims, 10 Drawing Sheets

CONVEYOR DRIVE AND SYSTEM FOR UNIT HANDLING CONVEYORS

BACKGROUND OF THE INVENTION

The present invention relates to conveyor systems, and more specifically to drive systems for unit handling roller conveyor systems.

Unit handling roller conveyor systems generally comprise sections, or zones, made up of conveyor frames supporting individual rollers. The rollers of each zone are driven by a motor and transport items from one end of the zone to the other. Each zone may have separate controls with the zone and associated controls interconnected with other zones to form a larger conveying system. Further, these systems may be configured to operate in various modes depending on the physical characteristics of the products being conveyed and the needs of the end users of the conveyor systems.

For instance, a common operating mode is referred to as zero-pressure accumulation ("ZPA") wherein an individual parcel being conveyed is the only parcel that is permitted to occupy a single zone, or occasionally multiple zones depending on the relative sizes of the parcel and the zones. In this mode, typically the parcels are prevented from coming into contact with the parcels in adjacent zones making it suitable for conveying products that are fragile, of particularly high value or that have to be individually sorted or weighed at some point further along the system.

Another common mode is referred to as low-pressure accumulation (LPA) wherein the conveyor system is used for in-process storage and the goal is to allow a given number of zones to provide storage for the greatest possible number of parcels without causing damage to the parcels.

Yet another common mode is pure transport where a section of conveyor comprised of multiple zones simply runs continuously in order to transport the parcels from one end to the other without regard for issues related to spacing or contact between parcels.

It is not uncommon for systems to include an inclined section of conveyor that requires additional torque or to have a junction where parcels have to be accelerated from a complete stop to full speed in a very short distance or very short period of time in order to properly merge with parcels on an intersecting section of conveyor.

Yet another operating mode is where the entire system needs to be monitored and controlled from a single computer in order to track the location of individual parcels or to facilitate the identification of trouble spots or failure modes within the system.

Given the extreme variability of the needs of the end users, it is highly desirable for a conveyor manufacturer to have a single set of component parts in inventory from which it is possible to readily configure the systems required by customers in order to satisfy their needs quickly and at a competitive price.

SUMMARY OF THE INVENTION

The present invention provides a conveyor drive system for unit handling conveyors. The drive system includes a drive motor having a highly reliable integrated motor drive controller and the associated control system that allows the conveyor to operate in a variety of modes while using the greatest number of interchangeable component parts.

High Reliability: Unit handling conveyor systems are typically in use for more than a decade therefore reliability of the system is a very important issue. Motor driven rollers have motors that operate at very high speeds and the power from the motor must then be transmitted to the roller by means of a multi-stage gear reduction system that necessarily makes use of very small gears which become a weak point in the life of the drive. Large diameter direct drive brushless motors of the type used in this system have much longer projected life because there are no gears involved and the motor is operating at much lower speeds and has room for much larger bearings, therefore other components become the limiting factors in the life calculations.

In general, most motor failures are the result of excessive heat build up. With an internal motor driver circuit of the type envisioned the two primary sources of heat in the motor are the $I^2R$ losses in the windings and heat from the motor driver chip. A satisfactory motor design will likely have an efficiency of something on the order of 75% so a 50-watt motor may have to dissipate on the order of 8 watts from the windings. With a stator of 0.35 thickness and an outside diameter of 4⅝" the heat is conducted to a surface area of just over 5 $in^2$ or approximately 1.6 watts/$in^2$. By comparison, the motor driver chip may have to dissipate only 4.5 watts but with a size of only 0.3 $in^2$, it must dissipate close to 15 watts/$in^2$. With this order of magnitude difference it should be obvious that removing heat from the motor driver chip must be given the highest priority.

Figure 2:
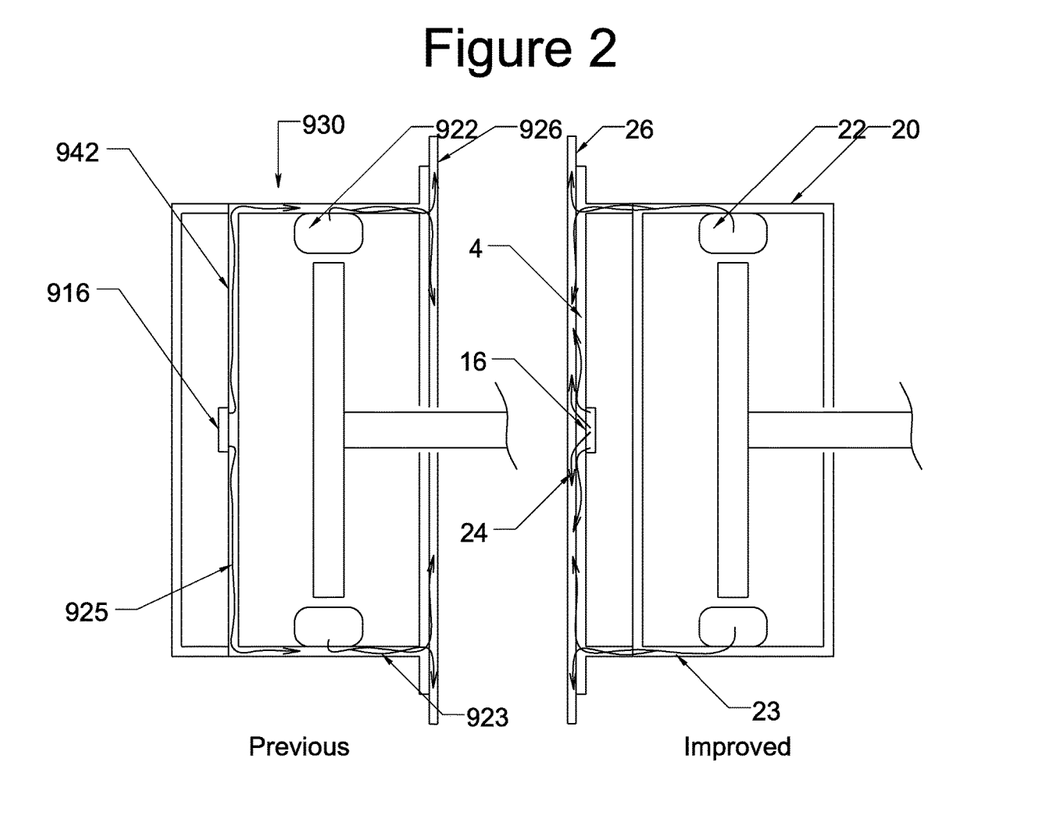
FIG. 2 is a simplified cross-sectional view showing a comparison of a prior art motor and a motor in accordance with an embodiment of the present invention.

Referring now to FIG. 2, a prior conveyor drive with integrated controller places the motor driver chip 916 on the rear surface of the motor assembly 930 so that the heat dissipation path 925 from the chip 916 is through a surface that is already heated by the motor windings (e.g. heat dissipation path 923 from stator 922) and must then be conducted through to the furthest surface of the motor assembly 930 prior to conduction to the mounting bracket 926 and/or frame of the conveyor (See leftmost illustration in FIG. 2). In one embodiment, the present invention is configured to conduct the heat from the motor driver chip 16 directly to an external surface of the motor annex 4, which in turn conducts the heat directly to a large metal bracket 26 which provides a surface for convection and radiation to the atmosphere as well as conduction to the conveyor frame member 36 (FIG. 3), providing more efficient heat dissipation and therefore potentially much longer life (See rightmost illustration in FIG. 2).

Motor Design: The motor housing encloses the rotor, bearings, stator assembly and motor shaft. The system may include a rotary encoder to provide feedback to a motor driver board located in the control annex, allowing for proper commutation of the motor to control the desired speed and direction of travel. In one embodiment, the rotary encoder is an optical encoder with a gated interrupter device (e.g. rotary encoder) coupled to the motor shaft. Although not shown, the rotary encoder may alternatively include a Hall-effect sensor ("HES"). In alternative embodiments that include an HES, the motor may include an HES board which provides a convenient location for interconnection of the motor phases and locates the Hall-effect sensors in proximity to the magnets on the rotor.

The motor driver board includes a DMOS motor control circuit that decodes the signals from the rotary encoder (e.g optical encoder or alternative HES encoder) and an associated microprocessor collocated on the motor driver board in order to control the speed, torque, direction of rotation and braking mode for the motor when it must stop. The microprocessor also decodes instructions received from an external controller through an RJ45 connector and associated Cat6 cable (or Cat5 cable) in order to set the variable outputs on the motor drive DMOS. The ability to adjust the torque dynamically adds significant functional value, in particular in the case of low pressure accumulation systems.

The motor assembly including the motor driver circuit is typically configured to be mounted beneath the rollers and between the conveyor frame members on a bracket attached to one of the frame members. The output shaft of the motor is connected to at least one of the rollers above through a pulley, sheave or sprocket by means of a flexible friction drive belt, timing belt, drive chain or other mechanical means in order to transmit torque at the speed required by the system for the zone above. The roller(s) driven directly by the motor are typically linked to adjacent rollers in order to power an entire zone of the conveyor.

Ease of Access to Controls: Since the motor assembly is mounted beneath the rollers and between the frame members it is well protected but not located for easy access to any controls, therefore all commands to the motor and feedback from the motor are communicated through an RJ45 jack and mating RJ45 plug and Cat5/Cat6 cable assembly, which allows any user accessible control switches to be located in a convenient location of their choosing.

Extreme Flexibility: In one embodiment of the invention the zone control device may be conveniently mounted on the outer face of the conveyor frame.

In another embodiment of the invention the control may at some significant distance on a central control panel.

In another embodiment of the invention, by means of a secondary RJ45 jack on the motor, commands from a single controller may be passed sequentially from one motor to adjacent motors to simultaneously control multiple motors in a single zone where additional power is required.

In another embodiment of the invention, the secondary RJ45 jacks may be connected sequentially from zone to zone in order to control the speed, direction and start-stop commands for multiple zones from a single control point.

In another embodiment of the invention, the controls for the individual zones may be connected to adjacent zones to operate in zero-pressure accumulation mode turning zones off when the zone and the adjacent downstream zone are both occupied.

In another embodiment of the invention, the controls for the individual zones may be connected to adjacent zones to operate in low-pressure accumulation mode, reducing the torque proportionally and ultimately to zero as upstream zones fill.

In yet another embodiment of the invention, the controls from the individual zones may be connected to a central computer or PLC in order to monitor an entire system to track individual parcels or identify trouble spots.

The present invention provides a reliable and flexible conveyor drive system for unit handling conveyors. The system may include an integrated motor drive controller and external control logic provided, for example, by a conveyor or zone controller. The motor assembly includes a motor annex that houses the motor drive controller in a configuration that provides improved heat dissipation. The motor drive controller may include a conventional jack, such as an RJ45 jack, to communicate with an external conveyor or zone controller. The motor drive controller may include a supplemental conventional jack to allow commands from a single motor drive controller to be passed to another, which facilitates additional flexibility in control, such as simultaneous control over multiple motors in a single zone where additional power is desired.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

Overview.

Figure 1:
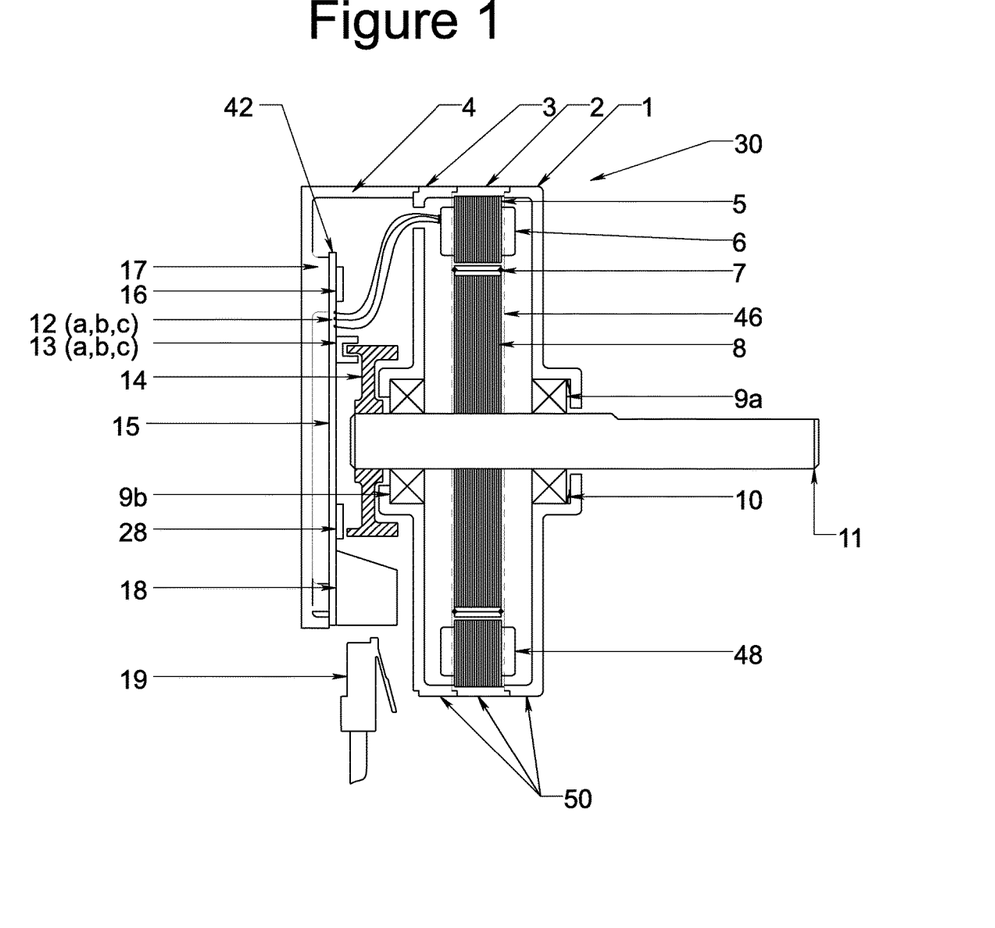
FIG. 1 is a cross-sectional view of a motor in accordance with an embodiment of the present invention.
Figure 7:
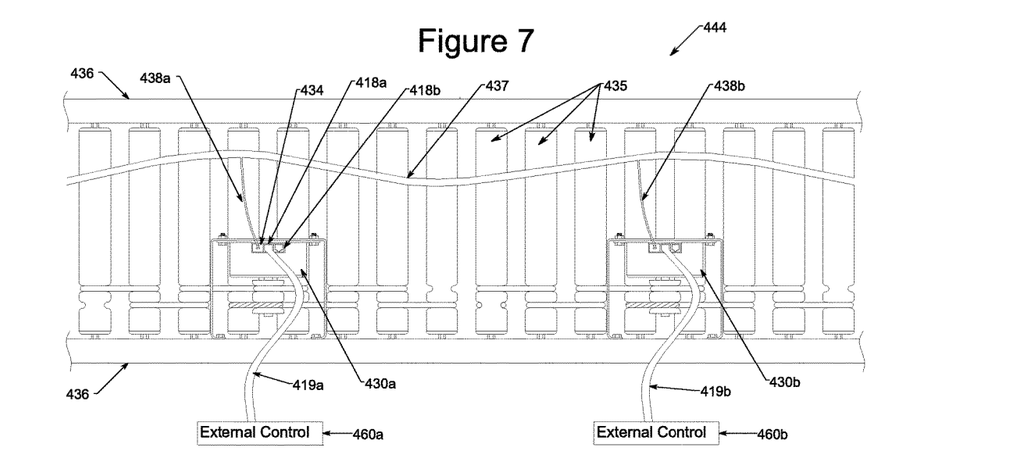
FIG. 7 is a bottom view of a portion of an exemplary conveyor assembly showing two adjacent conveyor zone assemblies.
Figure 8:
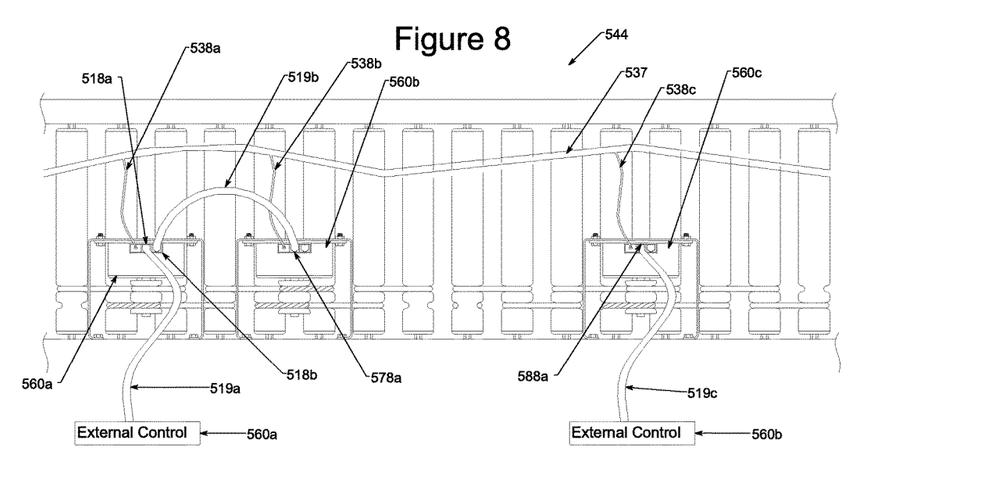
FIG. 8 is a bottom view of a portion of an alternative conveyor assembly showing two adjacent conveyor zone assemblies.
Figure 9:
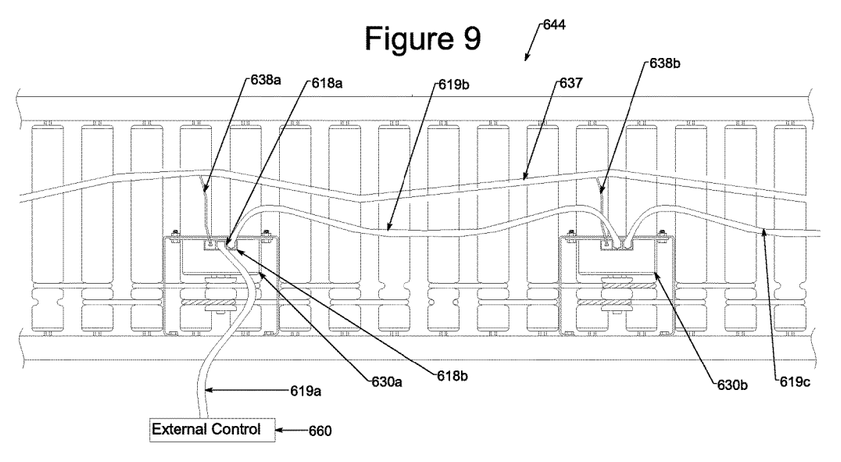
FIG. 9 is a bottom view of a portion of a second alternative conveyor assembly showing two adjacent conveyor zone assemblies.

A motor assembly 30 in accordance with an embodiment of the present invention is shown in FIG. 1. The motor assembly 30 may be integrated into a unit handling roller conveyor system, for example, into roller conveyor system 44 (a portion of which is shown in part in FIG. 3), roller conveyor system 444 (a portion of which is shown in FIG. 7), roller conveyor system 544 (a portion of which is shown in FIG. 8) or roller conveyor system 644 (a portion of which is shown in FIG. 9). In each of these embodiments, the roller conveyor system includes a pair of conveyor frames 36, 436, 536, 636 that support conveyor rollers 35, 435, 535, 635. In these embodiments, the motor assembly 30, 430, 530, 630 is mounted below the conveyor rollers 35, 435, 535, 635 and between the conveyor frames 36, 436, 536, 636. The motor assembly 30, 430, 530, 630 is operatively coupled to the conveyor rollers 35, 435, 535, 635 by a plurality of belts 32/33, 432/433, 532/533. 632/633.

Figure 3:
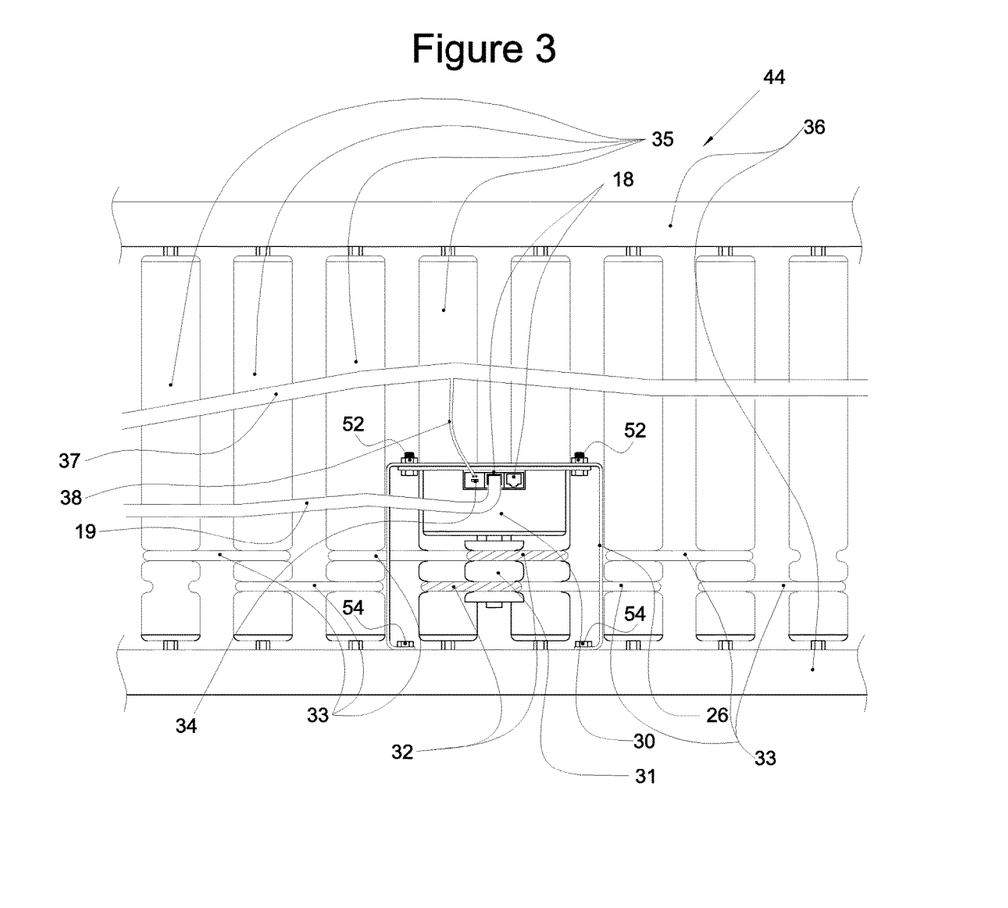
FIG. 3 is a bottom view of an exemplary conveyor zone assembly in accordance with an embodiment of the present invention.
Figure 4:
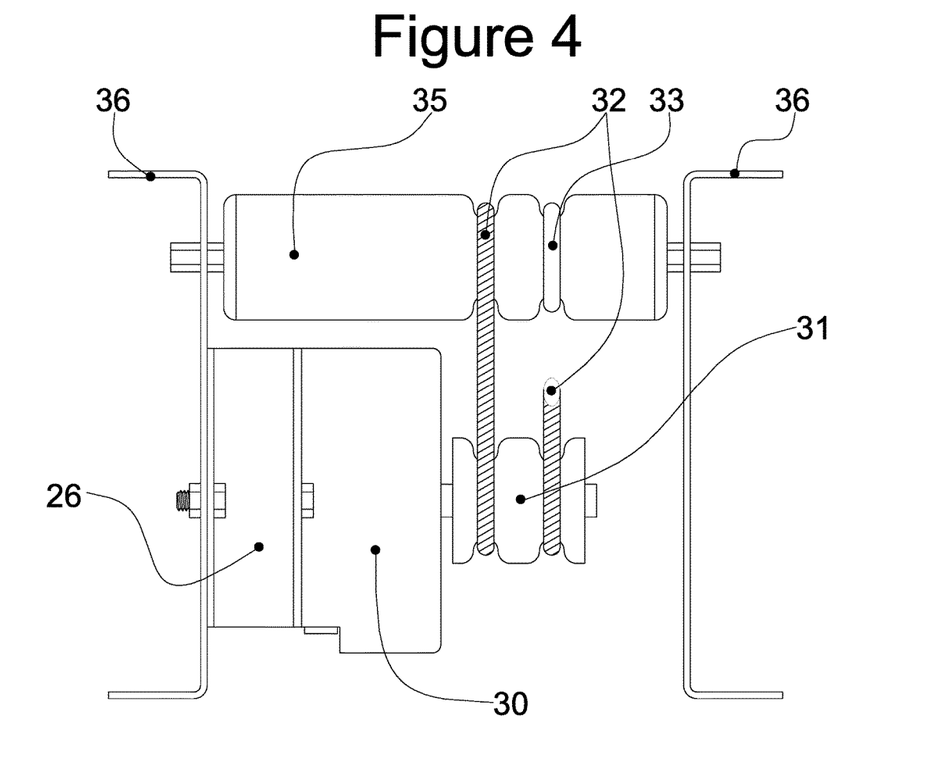
FIG. 4 is an end view of a portion of an alternative conveyor zone assembly similar to the conveyor zone assembly of FIG. 3.

The motor assembly 30 of FIG. 1 includes an integrated motor drive controller 42 having a motor driver PCB 15 with a motor driver chip 16. A motor driver annex 4 is attached to the rear motor housing 3 to receive and support the motor drive controller 42. The motor driver PCB 15 (with motor driver chip 16) is mounted to the external surface of the motor driver annex 4 opposite the rear motor housing 3. As a result, heat flows directly from the motor driver PCB 15 and motor driver chip 16 directly to the motor driver annex 4. The motor assembly 30 is configured to be mounted to the conveyor frame 36 by a motor bracket 26. For example, in typical applications where the conveyor frames are not proximate to each other, the bracket 26 may wrap around the motor as shown in FIG. 3. As an alternative example, the bracket 26 may be positioned behind the motor when the conveyor frames are located in close proximity to each other as shown in FIG. 4. In a bracket attachment, the external surface of the motor driver annex 4 is in direct contact with the motor bracket 26. As a result, heat generated by the motor drive control assembly 32 is more efficiently routed to the conveyor frame 36 for dissipation.

In the illustrated embodiment, the motor assembly 30 includes a position sensor, such as a rotary encoder. For example, the motor assembly 30 may include an optical encoder 13a, b and c. A gated interrupter device 14, such as an encoder wheel, is secured to the motor shaft 11 to interrupt the passage of light from the emitters to the receivers on the optical device, detecting the relative location of the motor rotor so that the motor coils in the stator may be energized in the proper sequence. Three leads 12a, b and c from the respective coils are routed through a small opening in the rear motor housing 3 and connected to the driver board during the motor assembly. In an alternative embodiment, the rotary encoder may be a Hall Effect sensor that is mounted to a sensor circuit board (not shown) situated inside the motor housing assembly. This provides convenient positioning of the position sensor proximate magnets 7 on the rotor 8. In such applications, the sensor circuit board (not shown) may be connected to the motor driver PCB 15 by a board-to-board connector (not shown).

Figure 6:
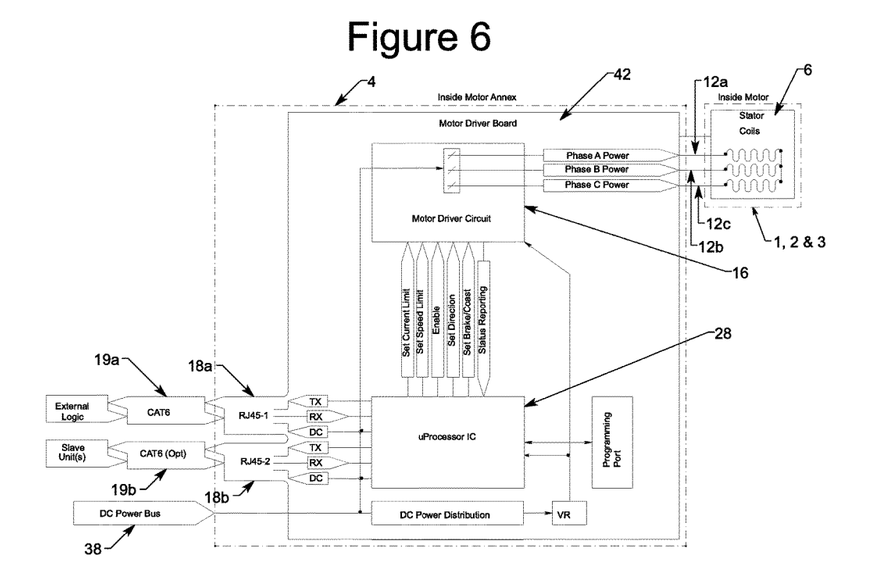
FIG. 6 is a block diagram illustrating the motor drive circuit and associated connections to the motor phases and external controllers.

As noted above, the motor assembly 30 is generally positioned below the conveyor rollers 35 and between the conveyor frames 36 where is it difficult to access but well protected from physical damage. The system is configured so that motor commands and motor feedback are communicated through a plug and cable assembly to user accessible controls located at a convenient location. For example, the motor drive controller 42 may include an RJ45 jack 18 that receives a mating RJ45 plug and Cat5/Cat6 cable assembly 19. To provide additional flexibility, each motor drive control assembly 42 may include a secondary RJ45 jack 18 that allows a plurality of motor drive control assemblies 19 to be chained together in different arrangements as shown in FIGS. 6-8.

Directional terms, such as "rear," "front," "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s). The present invention is described in the context of a unit handling roller conveyor system, but it may be incorporated into other types of conveyor systems.

Roller Conveyor System.

As noted above, FIG. 1 shows a motor assembly 30 in accordance with an embodiment of the present invention. The motor assembly 30 of this embodiment is a brushless direct current ("BLDC") motor that generally includes a rotor 46, a stator 48, and a housing 50. Although the motor specifications may vary, a suitable motor for one application is a 24 VDC multipole brushless motor capable of operating between ~38 RPM to 380 RPM under full rated load of 7 in-lbf with substantially higher torque available for acceleration or on an intermittent basis. The rotor 46 generally includes a motor shaft 11, a plurality of rotor laminations 8 secured to the motor shaft 11 and a plurality of magnets 7 carried by the rotor laminations 8. The number and arrangement of magnets may vary from application to application. For example, the rotor 46 may include two permanent magnets 7 that each extend through about 180 degrees of the circumference of the rotor 46 (2-pole arrangement), four permanent magnets 7 that each extend through about 90 degrees of the circumference of the rotor 46 (4-pole arrangement) or eight permanent magnets 7 that each extend through about 45 degrees of the circumference of the rotor 46 (8-pole arrangement). The stator 48 generally includes a plurality of stator laminations 5 and stator coils 6. The number and arrangement of laminations 5 and coils 6 may vary from application to application. For example, the stator 48 may include three coils 6 that each extend through about 120 degrees of the circumference of the stator 48 (2-pole arrangement), six coils 6 that each extend through about 60 degrees of the circumference of the stator 48 (4-pole arrangement) or nine coils 6 that each extend through about 40 degrees of the circumference of the stator 48 (8-pole arrangement). These are merely examples and the motor assembly 30 may include essentially any suitable arrangement of magnets and coils. In the illustrated embodiment, the stator 48 is situated outside the rotor 46 as shown in FIG. 1 (inner rotor design). The inner rotor design may help to dissipate heat generated by the stator coils and may result in lower rotor inertia. However, the stator may alternatively be disposed within the rotor (outer rotor design), if desired.

The housing 50 generally includes a front motor housing 1, a center motor housing 2 and a rear motor housing 3. The illustrated housing 50 is merely exemplary and the motor assembly 30 may include essentially any suitable housing configuration. For example, the front motor housing 1 and central motor housing 2 may be integrated into a single housing part or the rear motor housing 3 and the central motor housing 2 may be integrated into a single housing part. The motor shaft 11 is rotatably mounted within the housing 50 by bushings, bearings or other friction reduction components. For example, as shown in FIG. 1, the motor shaft 11 may be positioned within a front bearing 9a seated in the front motor housing 1 and a rear bearing 9b seated in the rear motor housing 3. A wave spring 10 may be disposed between the bearing 9a and front motor housing 1 to provide axial bias.

The motor assembly 30 of FIG. 1 is merely exemplary and various aspects of the present invention may be incorporated into alternative motor assemblies, including alternative brushless motors and brushed motors.

The motor assembly 30 of FIG. 1 includes an integrated motor drive controller 42 (also known as "motor commutation circuit" or "motor commutation drive circuit"). The design and configuration of the motor drive control assembly may vary from application to application. For example, the motor drive control functions may be implemented in a single microprocessor with associated circuitry or may be distributed over multiple processors with associated circuitry. In the illustrated embodiment, the motor drive controller 42 includes a motor driver chip 16 and DMOS motor control circuitry installed on a motor driver PCB 15. A motor driver annex 4 is attached to the rear motor housing 16 to receive and support the motor drive controller 42. The motor driver PCB 15 (with motor driver chip 16) is mounted to the inside of the external surface of the motor driver annex 4 opposite the rear motor housing 3. As a result, heat flows directly from the motor driver PCB 15 and motor driver chip 16 directly to the motor driver annex 4. The motor assembly 30 is configured to be mounted to the conveyor frame 36 either directly (See FIG. 4) or by a motor bracket 26 (See FIG. 3). Referring now to FIGS. 2-4 and 5, the motor driver annex 4, 4' of various illustrated embodiments includes a pair of flanges 51, 51' configured to receive fasteners, such as bolts 52, 52', for attaching the motor driver annex 4 to the motor bracket 26 or other support structure. As perhaps best shown in FIG. 5, the flanges 51' may extend from opposite sides of the motor driver annex. The flanges 51. 51' may be an integral part of the motor driver annex 4, 4' or may be manufactured separately and intersecured with the motor driver annex 4, 4' during assembly. The number, size, shape and configuration of the flanges 51, 51' may vary from application to application. In some alternative embodiments, the flanges may be eliminated and the motor driver annex may be mounted to a support structure using alternative mounting arrangements. In a direct attachment, the external surface of the motor driver annex 4 is in direct contact with the conveyor frame 36. In a bracket attachment, the external surface of the motor driver annex 4 is in direct contact with the motor bracket 26. As a result, heat generated by the motor drive control assembly 32 can be dissipated by the motor driver annex 4 and the motor bracket 26 (when used), and is more efficiently routed to the conveyor frame 306 for further dissipation without passing through the motor housing 50. The motor bracket may be implemented by a single bracket or a plurality of brackets.

The motor drive controller 42 of the illustrated embodiment receives input from multiple sensors that provide signals representative of the position of the rotor 46 with respect to the stator 48. For example, in the illustrated embodiment, the motor assembly 30 includes a plurality of optical sensors that are mounted to the motor drive board assembly. As shown in FIG. 1, an optical encoder wheel 14 may be affixed to the end of the motor shaft 11 extending into the control annex area. Protrusions on the encoder wheel corresponding to the north poles on the rotor interrupt the passage of light from the emitters to the receivers on three photomicrosensors 13a, b and c located in an arc on the motor driver board 15. In the case of selection to produce this motor with either Hall-effect or optical encoder based commutation, the sensors could be located at 60° electrical separation and could use a single board with an arc in excess of 120° electrical. Given the potential to use of a large number of poles, the devices may be sufficiently large as to require spacing at 0°, 420° and 840° electrical. In applications that use Hall-effect sensors (not shown), the sensors may be carried by a separate sensor PCB. The sensor PCB may be secured to the interior surface of the rear motor housing 3. Alternatively, the sensor PCB may be positioned elsewhere within the motor housing 50. When used, the sensor PCB provides convenient positioning of the Hall-effect sensors proximate magnets (not shown) on the rotor 8. The sensor PCB may also provide a convenient location for interconnection of the motor phases. The sensor PCB may be connected to the motor driver PCB 15 by a board-to-board connector that passes through an opening in the rear motor housing 3. The connector may include wires for the sensors and for the motor phases. As an alternative, the position sensor(s) may be eliminated and the motor drive controller 42 may determine rotor information using a sensor-less configuration, such as back-EMF sensing.

In operation, the DMOS motor control circuitry 16 decodes the signals from the photo microprocessors 13 a, b and c and an associated microprocessor 20 collocated on the motor driver PCB 15 in order to control the speed, torque, direction of rotation and braking mode for the motor assembly 30. The microprocessor 20 also decodes instructions received from an external controller, such as a central controller or a zone controller, through an RJ45 connector 18 and associated Cat5/Cat6 cable 19 in order to set the variable outputs on the motor drive DMOS. The ability of the motor drive controller 42 to adjust the torque dynamically adds significant functional value, in particular in the case of low pressure accumulation systems.

FIG. 6 is a block diagram illustrating one exemplary motor drive circuit and the associated connections to the motor phases and external controllers. In this embodiment, the DC power bus connection distributes power to the microprocessor 28, the motor driver circuit 16 and subsequently to the stator coils 6 internal to the motor. Also, by way of primary jack (RJ45-1) 18a and secondary jack (RJ45-2) 18b it is capable of powering external controllers and associated photo-sensors which provide feedback regarding the "empty" or "full" status of the zones being powered by the drive. The microprocessor 28 receives digital commands and provides status reports to the external logic controller via the primary jack (RJ45-1) 18a and repeats the commands through RJ-45-2 18b so that multiple motors may be controlled simultaneously as described later.

The present invention provides a conveyor drive system that can be incorporated into a wide range of conveyor systems. For example, the conveyor drive system may be incorporated into unit handling roller conveyor systems of different sizes, shapes and configurations. In a typical application, the conveyor system includes a plurality of sections or zones with each zone typically including one or more motor assemblies that drive the conveyor rollers in that zone. A conveyor controller and/or plurality of zone controllers are often provided to orchestrate interaction between the different zones. In the illustrated embodiment, each motor assembly 30 includes an integrated motor drive controller 42. FIG. 3 is an illustration of an exemplary zone of a roller conveyor system 44 incorporating the motor assembly 30 of FIG. 1. Typically, the roller conveyor system 44 will include one or more additional zones that are coordinated with one another to implement the desired functionality. Although the specific design and configuration of the roller conveyor system may vary, the roller conveyor system 44 of the illustrated embodiment includes a plurality of conveyor rollers 35 that are supported at opposite ends by conveyor frames 36. Although not shown, the conveyor frames 36 may be mounted to essentially any desired support structure, such as pedestals, legs or other similar structures. In the illustrated embodiment, the motor assembly 30 is mounted beneath the conveyor rollers 35 between the conveyor frames 36. Although the mounting location and configuration may vary, the motor assembly 30 of FIG. 3 is mounted to a motor bracket 26 that is, in turn, mounted to a conveyor frame 36. As shown, the motor assembly 30 is coupled to conveyor rollers by a drive belt arrangement. More specifically, the motor shaft 11 is fitted with a sheave 31 that connects the motor output to a pair of adjacent conveyor rollers 35 by primary drive belts 32. The conveyor rollers 35 that receive the primary drive belts 32 are, in turn, coupled to additional adjacent conveyor rollers 35 by secondary drive belts 33. Secondary drive belts 33 may be chained to provide motivation to all desired conveyor rollers 35. The illustrated drive belt arrangement is merely exemplary and the motor assembly and conveyor rollers may be operatively coupled using other drive arrangements. For example, the sheave 31 may be replaced by a sprocket and the primary drive belts may be replaced by drive chains (e.g. roller chains) or the sheave 31 may be replaced by an output gear that is engaged with corresponding gears on the conveyor rollers.

Figure 5:
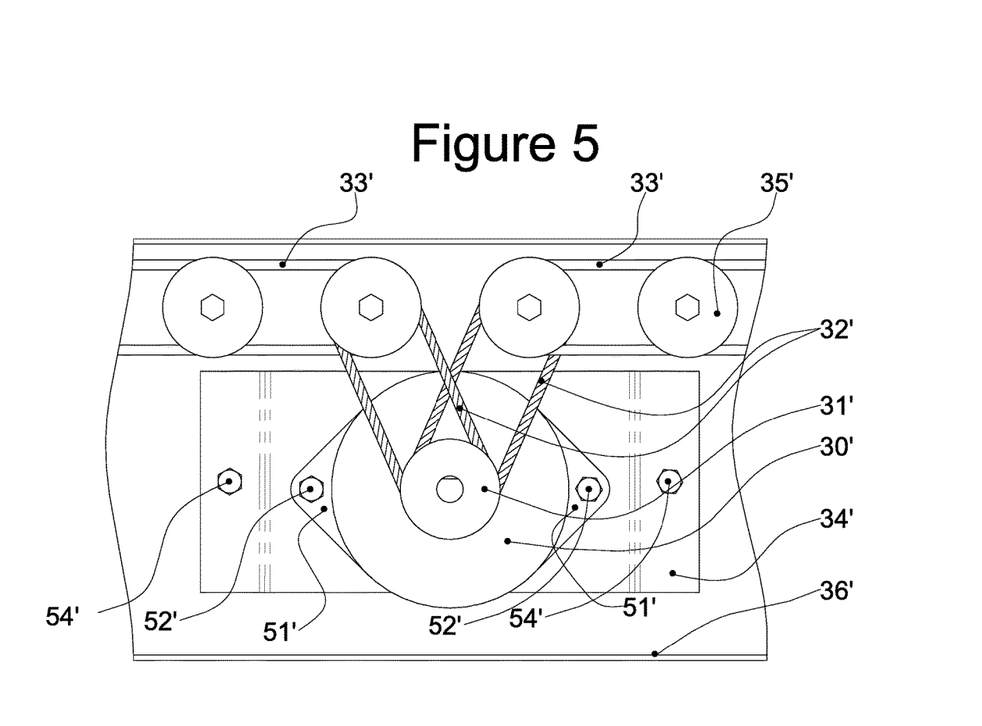
FIG. 5 is a cross-sectional view of the alternative conveyor zone assembly of FIG. 4.

In the embodiment of FIG. 3, the motor bracket 26 is configured to extend around and partially surround the motor assembly 30. As shown, the motor assembly 30 is affixed to the motor bracket 26, for example, by bolts 52, and the motor bracket 26 is secured to the conveyor frame 36, for example, by bolts 54. The design and configuration of the bracketing may vary from application to application. FIGS. 4 and 5 show an alternative embodiment in which the motor bracket 26' is configured so that it does not extend around the motor assembly 30'. As shown, the motor assembly 30' may be affixed to the motor bracket 26' by bolts 52' and the motor bracket may be mounted to the conveyor frame 36' by bolts 54'. In this embodiment, the sheave 31' and primary drive belts 32' are exposed rather than being partially enclosed by the motor bracket 26'. In another alternative configuration, the motor bracket 26' may be eliminated and the motor assembly 30' may be bolted directly to the conveyor frame 36' (not shown).

In the embodiments of FIG. 3 and FIG. 4, the exterior surface of the motor driver annex is engaged with the motor bracket 26, 26'. This provides improved heat dissipation over the prior configuration shown on the left side of FIG. 2. As shown in the comparison of FIG. 2, at least one prior motor assembly 930 includes an integrated motor driver controller 942 that is mounted directly to the rear of the motor housing 950 and a motor bracket 926 that is mounted to the front of the motor housing 950. In use, heat generated by the motor driver controller follows heat path 925 which passes through the motor housing to the motor bracket. This path requires heat generated by the motor driver controller to flow through portions of the motor housing that also form a heat path 923 along which heat generated by the stator is dissipated. As a result, the heat path from the motor driver controller 942 and the stator 922 flow through the motor housing 950. With motor assembly 30 (right side of FIG. 2), the motor driver annex 4 and motor bracket 26 are mounted to the rear of the motor assembly 30. Further, the motor driver controller 42 is mounted to the outer wall of the motor driver annex 4 rather than the rear motor housing 3. As a result, the heat path 24 for heat generated by the motor driver controller 42, including motor driver chip 16, is through the outside or rear wall of the motor driver annex 4 and the adjacent motor bracket 26 (and not through the motor housing 50). The heat path 23 for heat generated by the stator is through the motor housing 50 to the motor driver annex 4 and then to the motor bracket 26. As noted previously, this approach provides significantly better heat dissipation for the motor drive controller 42.

Motor assemblies in accordance with the present invention are well-suited for use in a wide range of control architectures. For example, in the illustrated embodiment, the motor driver controller 42 is configured to control the motor assembly 30 based on instructions received from an external controller. The external controller may include a central controller and/or a plurality of zone controllers that control operation of the conveyor system on a zone-by-zone basis. To illustrate, the conveyor system 44 may include a central controller configured to coordinate operation of the various conveyor zones by communicating directly with the motor driver controllers 42 in each zone or by communicating with separate zone controllers that, in turn, communicate with the corresponding motor driver controllers 42. In another alternative, the central controller may be eliminated and the zone controllers may be configured to communicate with one another to provide coordination between operations of the various zones. These various control architectures are merely exemplary and the conveyor system 44 may be implemented using any other suitable control architecture involving essentially any form of centralized or distributed control.

The controllers of the roller conveyor system 44 may communicate with one another using essentially any desired communication protocol. For example, the controllers may utilize a standard communication protocol or a proprietary communication protocol. In the illustrated embodiment, the controllers are configured to communicate using wired connections. To provide flexibility and facilitate installation, each motor driver controller 42 may include a plug and cable assembly that allows easy attachment of network wiring. In the illustrated embodiment, the system is configured so that motor commands and motor feedback are communicated through a plug and cable assembly. The communications may be exchanged with an external controller or to user accessible control switches located at a convenient location. For example, the motor drive controller 42 may include an RJ45 jack 18*a* that receives a mating RJ45 plug and CAT6 cable assembly 19. To provide additional flexibility, each motor drive control assembly 19 may include a secondary RJ45 jack 18*b* that allows a plurality of motor drive control assemblies 19 to be chained together in different arrangements as shown in FIGS. 7-9. The motor drive controller 42 may be configured to repeat communications between the primary and secondary jacks. For example, the motor drive controller 42 may be configured to repeat or pass through communications between the primary RJ45 jack 18*a* and the secondary RJ45 jack 18*b* so that a central controller or a zone controller can simultaneously control multiple motors in unison with a single set of motor instructions. The motor drive controller 42 of the illustrated embodiment is configured to repeat incoming commands received via the primary jack 18*a* by sending those commands as outgoing commands via the secondary jack 18*b*. Similarly, the motor drive controller 42 is configured to report the actual status of the motor such as the operating speed and direction or fault messages via the primary jack 18*a*. In the embodiment of FIG. 3, the motor assembly 30 receives power from a DC power bus 37. As shown, a zone power drop 38 extends from the DC power bus 37 to the motor assembly 30 via power jack 34. FIG. 7 shows a portion of a conveyor assembly 444 in accordance with one implementation of the present invention in which adjacent motor assemblies 430a-b are controlled by separate zone controllers 460a-b. In this embodiment, each zone controller 460a-b is linked to its corresponding motor assembly 430a-b by a plug and cable assembly 19a-b. Although not illustrated in FIG. 7, the zone controllers 460a-b may be connected to a central controller (not shown) that coordinates operation of the separate zone controllers 460a-b. For example, the zone controllers 460a-b may be networked with a central controller using wired or wireless communications. Alternatively, the zone controllers 460a-b may be connected to one another using wired or wireless communications to allow the zones to coordinate in the absence of a central processor. In this embodiment, the motor assemblies 430a-b receive power from a DC power bus 437. As shown, a zone power drop 438-ab extends from the DC power bus 437 to each of the motor assemblies 430 via power jack 34.

FIG. 8 shows a portion of an alternative conveyor assembly 544, including two adjacent zones. In this embodiment, the first zone includes a single zone controller 560a connected to two motor assemblies 530a-b to allow that zone controller 560a to simultaneously operate both motor assemblies 530a-b in unison. This may be useful in a variety of applications, such as when more than one motor is desired to provide additional torque to the conveyor rollers in that zone. As shown, the zone controller 560a is connected to the primary jack on the first motor assembly 530a by a plug and cable assembly 519a, and the first motor assembly 530a is connected to the second motor assembly 530b by a plug and cable assembly 519b extending from the secondary jack 518b of the first motor assembly 530a the primary jack 578a of the second motor assembly 530b. In this embodiment, the second zone includes a second zone controller 560b that is connected to the primary jack 588a of the motor assembly 530c by a plug and cable assembly 519c. In this embodiment, the conveyor system 544 includes a DC power bus 537 and a separate power drop 538a-c for each motor assembly 530a-c.

FIG. 9 shows a portion of another alternative conveyor system 644. This illustration shows two adjacent zones. In this embodiment, the conveyor system 644 includes a single central controller 660 that is coupled to a plurality of motor assemblies 630a-b by plug and cable assemblies 619a-b arranged in series. The central controller 660 may operate autonomously or it may interface with another control, such as a computer or PLC programmed to coordinate operation of the various conveyor zones. As shown, the single central controller 660 is connected to the primary jack 618a on the first motor assembly 630a by a plug and cable assembly 619a, and the first motor assembly 630a is connected to the second motor assembly 630b by a plug and cable assembly 619b extending from the secondary jack 618a of the first motor assembly 630a to the primary jack 618b of the second motor assembly 630b. FIG. 8 also shows another plug and cable assembly 619c extending from the secondary jack 618b of the second motor assembly 630b to a third motor assembly (not shown). This configuration may be repeated in series for the desired number of zones and the desired number of motor assemblies. In this embodiment, communications are arranged in packets that include a motor assembly identification field so that commands can be directed to a specific motor assembly and so that the central controller 660 can identify the sender of motor feedback communications. In this embodiment, the conveyor system 644 includes a DC power bus 637 and a separate power drop 638a-b for each motor assembly 630a-b.

Figure 10:
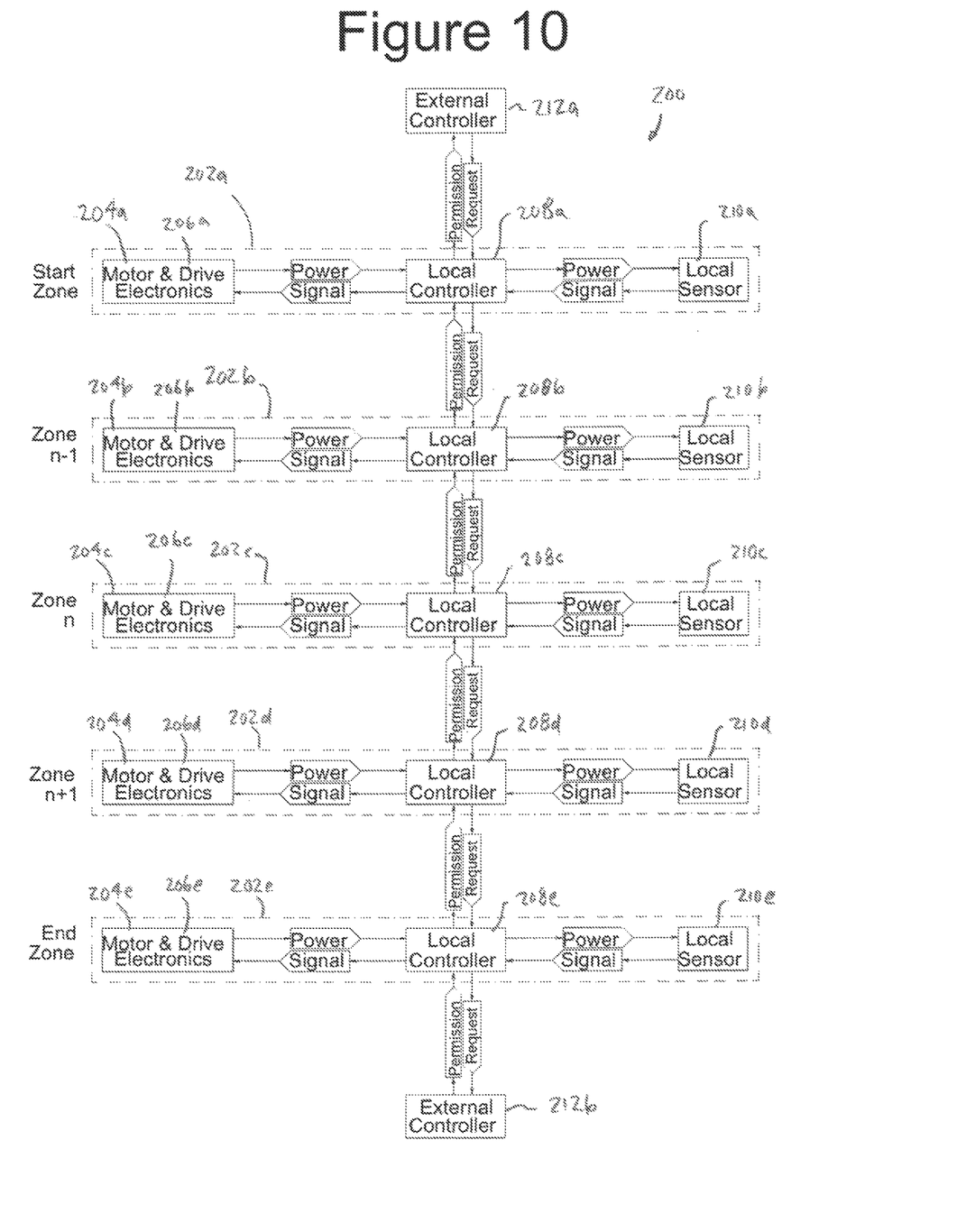
FIG. 10 is a block diagram of a series of conveyor zones set up to operate in zero pressure accumulation mode with a minimum of external control.

The present invention may be incorporated into a wide range of different conveyor systems that have different control architecture. For example, the present invention is well-suited for use in conveyor systems implementing a control architecture with limited external control. To illustrate one example, FIG. 10 is a block diagram of a conveyor system 200 having a series of conveyor zones 202a-e set up to operate in zero pressure accumulation mode with a minimum of external control. In this illustration, each zone 202a-e in the system 200 is configured with the motor 204a-e, drive electronics 206a-e, rollers and drive belts as described elsewhere in the application. Each zone 202a-e of this embodiment also has a logic controller 208a-e powered by the Cat 6 cable and most likely mounted on the conveyor frame adjacent to the zone 202a-e under its control. This local controller 208a-e is in turn connected to and powers a local sensor 210a-e which detects the presence or absence of a parcel on the rollers in the zone 202a-e. Each Zone (n) 202a-e also communicates with the controllers 208a-e in the adjacent zones. When Zone (n) 202c is not occupied by a parcel it transmits a permission signal to the upstream Zone (n−1) 202b allowing Zone (n−1) to discharge a parcel into Zone (n) 202c. Whenever Zone (n) 202c is already occupied it removes the permission signal causing Zone (n−1) 202b to stop parcels as they reach the downstream edge of Zone (n−1) 202b. Likewise, as parcels move into and across Zone (n) 202c they trigger the sensor 210c in Zone (n) 202c and Zone (n) 202c communicates a request to Zone (n+1) 202d. If a permission signal is being transmitted by Zone (n+1) 202d, Zone (n) 202c continues to transport the parcel and the request signal causes Zone (n+1) 202d to being running resulting in a smooth handoff from zone to zone.

The first zone 202a in the illustrated system labelled as the start zone does not have an adjacent upstream zone with which to communicate. The start zone's permission signal may be electronically converted to something as simple as a flashing light to notify an operator that it is available to accept a parcel or it may be something more complex that communicates with AGVs, for instance. Likewise, the start zone's 202a request signal may be generated by a foot switch or photo sensor in the case of a manually loaded system, or by some appropriate electronic device if the loading system is automated.

The final zone 202e in the illustrated system labelled as the end zone lacks an adjacent zone on the downstream edge. Without an incoming permission signal, it will stop parcels at its downstream edge and remove its outgoing permission signal from the adjacent upstream edge, putting the system into the accumulation mode. In a manually unloaded system, the request signal may be converted to a flashing light or similar signal to the operator. Simply lifting the parcel will cause the local sensor 210e to signal the local controller 208e that the zone 202e is now empty, restoring its outgoing permission signal and allowing the next parcel to move into the end zone. In the case of automated unloading, appropriate electronic methods may be used for communication with the unloading equipment.

In the embodiment of FIG. 10, high level control and monitoring of the conveyor system 200 is achieved by one or more external controllers. For example, a first external controller 212a is coupled to the start zone 202a and a second external controller is coupled to the end zone 202e. Although FIG. 10 shows two separate external controllers 212a-b, the system may alternatively be implemented with a single external controller that is coupled to one or both of the start zone 202a and the end zone 202e. The function of the external controller(s) may vary from application to application. For example, the external controller(s) may be used to start and stop the conveyor system 200 as a whole, to provide input relevant to operation of the start zone 202a and/or the end zone 202d and to monitor operation of the conveyor system 200 at various levels.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A conveyor system comprising:
   at least one zone, each zone including:
   a plurality of rollers rotatably mounted to a conveyor frame,
   a motor assembly having a rotor, a stator, a shaft and a motor housing, the rotor and the stator disposed within the motor housing, the motor housing having a first end and a second end, the shaft extending from the first end,
   a motor drive controller disposed within a motor annex, the motor annex mounted to the second end of the motor housing, the motor drive controller mounted to an inside surface of a wall of the motor annex, and
   a motor bracket affixed to the conveyor frame and to an outside surface of the wall of the motor annex, whereby the motor bracket provides a heat path to the conveyor frame for heat generated by the motor drive controller, the heat path not extending through the motor housing.

2. The conveyor system of claim 1 wherein the motor drive controller controls operation of the motor assembly based on commands received from an external controller, the motor drive controller including a power input jack, a primary communication jack to provide communication with the external controller and a secondary communication jack to provide communication with another motor drive controller.

3. The conveyor system of claim 2 wherein the primary communication jack and the secondary communication jack are RJ45 jacks, and wherein the external controller is connected to the motor drive controller by a plug and cable assembly.

4. The conveyor system of claim 3 wherein the motor assembly includes a sensor circuit board disposed within the motor housing, the sensor circuit board being coupled to the motor drive controller by a board-to-board connector.

5. The conveyor system of claim 3 wherein the motor drive controller is configured to repeat on the secondary communication jack commands received via the primary communication jack.

6. The conveyor system of claim 3 wherein the motor drive controller is configured to repeat on the secondary communication jack incoming communications received via the primary communication jack and to repeat on the primary communication jack incoming communications received via the secondary communication jack.

7. A conveyor system comprising:
   a plurality of conveyor zones, each of the zones including:
   a plurality of rollers rotatably mounted to a conveyor frame,
   a motor assembly including a motor housing,
   a motor annex mounted to the motor housing,
   a motor drive controller disposed within the interior of the motor annex and mounted to an inside surface of a wall of the motor annex, and
   a motor bracket affixed to the conveyor frame and to an outside surface of the wall of the motor annex, whereby the motor bracket provides a heat path to the conveyor frame for heat generated by the motor drive controller, the heat path not extending through the motor housing.

8. The conveyor system of claim 7 wherein the motor drive controller controls operation of the motor assembly based on commands received from an external controller, the motor drive controller including a power input jack, a primary communication jack to provide communication with the external controller and a secondary communication jack to provide communication with another motor drive controller.

9. The conveyor system of claim 8 wherein the primary communication jack and the secondary communication jack are RJ45 jacks, and wherein the external controller is connected to the motor drive controller by a plug and cable assembly.

10. The conveyor system of claim 8 wherein the motor assembly includes a sensor circuit board disposed within the motor housing, the sensor circuit board being coupled to the motor drive controller by a board-to-board connector.

11. The conveyor system of claim 8 wherein the motor drive controller is configured to repeat on the secondary communication jack commands received via the primary communication jack.

12. The conveyor system of claim 8 wherein the motor drive controller is configured to repeat on the secondary communication jack incoming communications received via the primary communication jack and to repeat on the primary communication jack incoming communications received via the secondary communication jack.

13. A roller conveyor system comprising:
   a first conveyor zone including:
   a plurality of rollers rotatably mounted to a first conveyor frame,
   a first motor assembly including a first motor housing,
   a first motor annex mounted to the first motor housing,
   a first motor drive controller disposed within the interior of the first motor annex and mounted to an inside surface of a wall of the first motor annex, the first motor drive controller including a primary communication jack and a secondary communication jack, and
a first motor bracket affixed to the first conveyor frame and to an outside surface of the wall of the first motor annex, whereby the first motor bracket provides a heat path to the first conveyor frame for heat generated by the first motor drive controller, the heat path not extending through the first motor housing;
a second conveyor zone including:
a plurality of rollers rotatably mounted to a second conveyor frame,
a second motor assembly including a second motor housing,
a second motor annex mounted to the second motor housing,
a second motor drive controller disposed within the interior of the second motor annex and mounted to an inside surface of a wall of the second motor annex, the second motor drive controller including a primary communication jack and a secondary communication jack, and
a second motor bracket affixed to the second conveyor frame and to an outside surface of the wall of the second motor annex, whereby the second motor bracket provides a heat path to the second conveyor frame for heat generated by the second motor drive controller, the heat path not extending through the second motor housing;
an external controller configured to issue commands to the first motor assembly and the second motor assembly;
a first communication link between the external controller and the primary communication jack of the first motor drive controller, the external controller configured to transmit commands to the first motor assembly and the second motor assembly via the first communication link; and
a second communication link between the secondary communication jack of the first motor drive controller and the primary communication jack of the second motor drive controller, the first motor drive controller configured to repeat the second motor assembly commands to the second motor assembly via the second communication link.

* * * * *